No. 745,629.

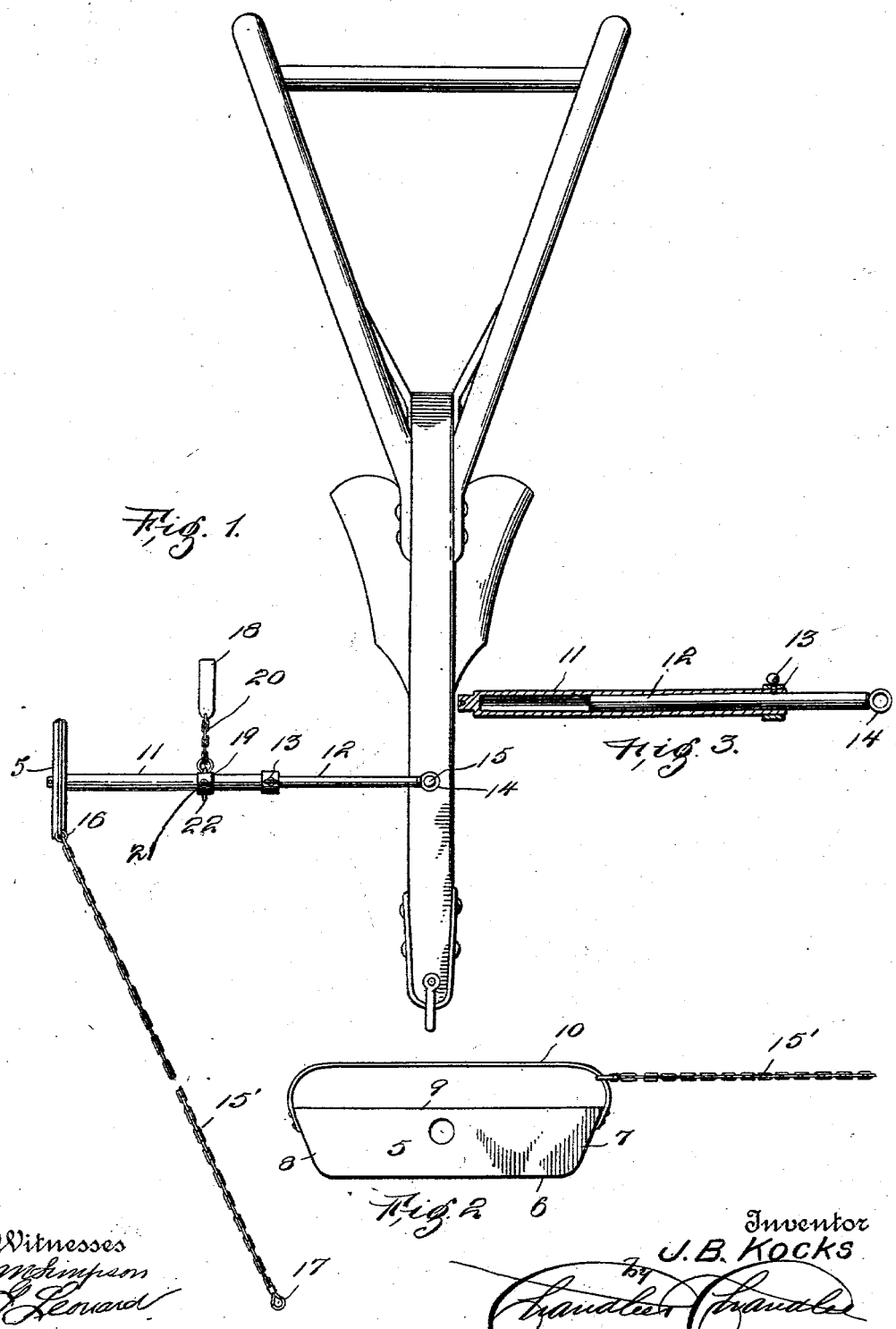

Patented December 1, 1903.

UNITED STATES PATENT OFFICE.

JOHN BARNEY KOCKS, OF TOURS, TEXAS.

MARKER.

SPECIFICATION forming part of Letters Patent No. 745,629, dated December 1, 1903.

Application filed May 16, 1903. Serial No. 157,441. (No model.)

*To all whom it may concern:*

Be it known that I, JOHN BARNEY KOCKS, a citizen of the United States, residing at Tours, in the county of McLennan, State of Texas, have invented certain new and useful Improvements in Markers; and I do hereby declare the following to be a full, clear, and exact description of the invention, such as will enable others skilled in the art to which it appertains to make and use the same.

This invention relates to markers for planters, plows, and other farm implements; and it has for its object to provide a marker which may be attached so as to operate at the side of the implement at any desired distance and by means of which a plurality of lines may be marked with any desired spacing within certain limits.

A further object of the invention is to provide an attachment which may be manufactured at a low cost.

In the drawings forming a portion of this specification, and in which like numerals of reference indicate similar parts in the several views, Figure 1 is a top plan view showing a plow with the marker attached thereto. Fig. 2 is a side elevation of the outer marker and its rope or line. Fig. 3 is a vertical section taken longitudinally of the outrigger of the marker.

Referring now to the drawings, the present marker includes a blade 5, the lower edge 6 of which is designed to enter the ground and is sharpened for that purpose, and the ends 7 and 8 of the blade diverge upwardly from the edge 6 to the major upper edge 9 of the blade. A bail 10, which may be in the form of a round iron rod, is attached to the ends of the blade 5 and extends in arch shape above the edge 9.

To hold the marking-blade 5 at the proper distance from the side of the implement, an outrigger is provided and consists of two members 11 and 12, which are telescopically connected and are held at different points of their correlative adjustment by means of the set-screw 13. The member 11 is engaged in a perforation in the blade 5 or may be secured thereto in any other desired manner at right angles, while the member 12 at its free end is provided with an eye 14, through which is engaged a pin 15 on the implement, to which the marker is attached, the outrigger including the members 11 and 12, projecting laterally beyond the side of the implement, so as to hold the blade 5 spaced at a proper distance beyond the side of the implement. The spacing of the blade relative to the implement may be changed by adjustment of the member 12 in the member 11.

To hold the marking-blade against rearward displacement during the progress of the implement, a stay is provided and consists of a line or chain 15', having a ring 16 at one end, which is disposed slidably upon the bail 10, so that it may pass freely from end to end thereof, and at the opposite end of the line or chain is a snap-hook 17, which is engaged in a hame-ring of the draft-animal that is hitched to the implement. When the marker is projected at one side of the implement, the ring 16 draws to one end of the bail 10, and when the marker is shifted to the other side of the implement the ring draws to the other end of the bail. The marker is thus readily adaptable to either side of the implement.

In order that a second line may be marked between the blade 5 and the implement, a supplemental marking-blade 18 is provided, and upon the member 11 of the outrigger is slidably disposed a collar 19, to which the blade 18 is connected by means of a chain 20, the collar 19 being held at different points of the length of the member 11 by means of the set-screw 21. By this arrangement both markers may be shifted toward and away from the side of the implement, or either marker may be shifted in such manner, and the spacing of the markers with respect to each other may be varied. It will be noted that the collar 19 has a depending bail 22, which is engaged through the end link of the chain 20 so that the chain may swing from one to end of the bail to correspond to the side of the implement at which the marker is projected.

In practice, modifications of the specific construction shown may be made and any suitable materials and proportions may be used for the various parts without departing from the spirit of the invention.

What is claimed is—

1. A marker for farm implements comprising a marking-blade, an extensible outrigger attached at one end to the blade and adapted for attachment of its opposite end to an implement, a bail connected to and extending longitudinally of the blade, a stay slidably connected at one end with the bail and adapted for attachment of its opposite end, and a supplemental marking-blade connected with the outrigger and adjustable toward and away from the first blade.

2. A marker for farm implements comprising a centrally-perforated marking-blade, an outrigger secured with one of its ends in the perforation and adapted for attachment of its opposite end to an implement, a clamp disposed upon the outrigger and adapted for movement toward and away from the marking-blade and a supplemental marking-blade connected to the clamp.

In testimony whereof I affix my signature in presence of two witnesses.

JOHN BARNEY KOCKS.

Witnesses:
W. C. PETER,
THEO RÖZZLER.